United States Patent [19]

Barth

[11] 3,887,539

[45] June 3, 1975

[54] ADHESIVE COMPOSITIONS

[75] Inventor: Bruce P. Barth, Somerville, N.J.

[73] Assignee: Union Carbide Corporation, New York, N.Y.

[22] Filed: Apr. 30, 1973

[21] Appl. No.: 355,677

[52] U.S. Cl. ............ 260/19 UA; 156/333; 156/335; 161/198; 161/215; 161/262; 161/264; 210/29.3; 210/845
[51] Int. Cl. .............................................. C08g 5/20
[58] Field of Search .............. 260/19 UA, 845, 29.3; 156/333, 335; 161/215, 198, 262, 264

[56] References Cited
UNITED STATES PATENTS

| | | | |
|---|---|---|---|
| 2,635,088 | 4/1953 | Holmes | 260/19 UA |
| 3,425,978 | 2/1969 | Armour | 260/845 |
| 3,427,268 | 2/1969 | Fries | 260/845 |
| 3,666,694 | 5/1972 | Ingram | 260/29.3 |

Primary Examiner—Melvyn I. Marquis
Attorney, Agent, or Firm—C. J. Metz

[57] ABSTRACT

The invention relates to mixtures of aqueous dispersions of alkaline-catalyzed phenol-formaldehyde resins and neoprene latices which can be employed as adhesive cements having excellent peel strengths, tack times and hot strengths.

3 Claims, No Drawings

ADHESIVE COMPOSITIONS

This invention relates to blends neoprene (i.e., polychloroprene) latices and aqueous phenolic resin dispersions which possess excellent adhesive characteristics, particularly as contact adhesives.

There is described in U.S. Pat. No. 2,610,910, the use of phenolic resins, that is, phenol-formaldehyde resins, in neoprene rubber compounds to produce what is called "adhesive cements." Resulting from the technology disclosed in that patent, there developed a substantial industry in which phenolic resins have been extensively employed in combination with neoprene to produce what is classified as contact cements. The phenolic is added to the neoprene for the main purposes of improving the tack of the adhesive, its shelf-like, its elevated temperature properties and the adhesion of the adhesive to various substrates. In U.S. Pat. No. 2,918,442, patented Dec. 22, 1959, and in U.S. Pat. No. 3,044,976, patented June 17, 1962, there are described the inclusion in such adhesives of metal oxides and hydroxides for the purposes of enhancing the various properties characterized above. These metals, in their oxide or hydroxide forms, form a soluble complex with the phenolic resin which can be easily incorporated into the neoprene compound. The most widely used metal oxide for forming such a complex is magnesium oxide. It is added to the phenolic resin with a small amount of water to effect the complexing reaction within a relatively short period of time, say, for example, within two to sixteen hours at room temperature.

The development of the use of metal oxides in phenol-formaldehyde modified neoprene adhesives, as well as the general techniques in formulating such adhesives, the composition of the phenol-formaldehyde resins, the properties of the neoprene elastomers per se, as well as the variety of information which has been gathered by the art in the utilization of such adhesives in noncommercial and commercial practices is only partially reflected by the following literature:

U.S. Pat No. 3,124,548, patented Mar. 10, 1964; U.S. Pat. No. 3,308,087, patented Mar. 7, 1967; U.S. Pat. No. 3,394,099, patented July 23, 1968; U.S. Pat. No. 3,427,268, patented Feb. 11, 1969; U.S. Pat. No. 3,595,821, patented July 27, 1971; Belgian Pat. No. 723,782.

It is not intended herein to repeat knowledge which is already possessed by those having ordinary skill in this art, nor to review the history of this art, except as such pertains to this invention.

As indicated above, phenolic resins contribute a variety of desirable properties to neoprene based adhesives. Three significant factors in the utility of such adhesives are peel strength, the ability of the adhesive to not creep or flow under high temperature conditions when being employed as an adhesive (called "hot strength", and the ability of the adhesive to remain tacky for a sufficient length of time ("tack time") so as to be useable under normal application conditions.

In U.S. Pat. No. 3,595,821, at column 1, lines 35-55, there is a discussion about a number of the abovementioned properties required for neoprene adhesives. For example, the term "bonding range" of the patent is equivalent to the term "tack time," as stated above, and the term "heat resistance" of the patent, is the same as the above stated "hot strength."

Phenolic resins which are typically employed in such neoprene adhesive formulations are generally made by the reaction of formaldehyde with a substituted phenol, particularly one which is substituted in the para position, such as para-tertiary butyl phenol and para-phenyl phenol. Usually, in the manufacture of these resins one employs an excess of the formaldehyde so as to produce in the resin reactive methylol groups and methylene ether units which interbond phenol moieties therein. These resins are characterized in the art as oil-soluble, heat-reactive phenol formaldehyde resins.

In response to ecological demands, various resins formulations which are used as coatings, adhesive, caulks and sealants, are being reformulated such that on setting or curing, a minimum amount of organic solvent or other organic volatile matter are eliminated. For example, resins which are used as particles suspended in water and containing a minimum of organic solvent, are favored.

Neoprene elastomers are available in latex form. They have been described as useful in making contact adhesives. Certain phenolic resins are described as modifiers for these neoprene latices. It is understood that such resins do not provide, in combination with the latex, an extremely effective contact adhesive.

With respect to a complete discussion on neoprene latices, reference is made to a book by John C. Carl, entitled: "Neoprene Latex — Principles of Compounding and Processing" published by the Elastomers Chemicals Department, E. I. Du Pont de Nemours and Co. (Inc.), Wilmington, Delaware (1962). At page 97, the text refers to the use of terpene phenolic resins, terpene resins, coumarone-indene resins, rosin ester, pentaerythritol esters, and phenolic modified coumarone-indene resins as tackifiers for neoprene latex adhesives. These resins are described as being added as emulsions to the neoprene latex.

U.S. Pat. No. 3,425,978, Feb. 4, 1969, has a substantial discussion of the manufacture of neoprene latex adhesive compositions, and the patent speaks about the inability to effect admixture of para-alkylated phenol-formaldehyde resins, or reaction products of those resins with magnesium oxide, with neoprene latices because of an incompatability which exists between the two. The patentee offers that the incompatability is believed to be the direct result of the instability of the neoprene latices in acidic media. To avoid the gelation, which the patentee considers to be the result of incompatability, the patentee employs a specified sulfonated phenolic resin for incorporation and in combination with the neoprene emulsions. The patentee finds that at least about 10 percent sulfonate groups based on the total weight of the sulfonated phenolic resin is needed in order to achieve the level of compatability which he believes is necessary in order for effective incorporation in a neoprene latex.

It has now been determined that a neoprene latex and an aqueous phenolic resin dispersion can be intermixed without the necessity of sulfonating the phenolic resin as described in U.S. Pat. No. 3,425,978, with the consequent achievement of an adhesive composition which can be employed very effectively as a contact adhesive to provide adhesive joints which have excellent peel strength, good open tack times, good initial bond strength and excellent elevated temperature strengths, as determined by peel strength determinations.

The neoprene latices suitable for use in this invention are described in the aforementioned book by Carl, particularly those which are listed on the inside cover of the text. These latices are typically made by emulsifying chloroprene in water, usually by means of a rosinate soap, and polymerized with the aid of a potassium persulfate catalyst. Progress of the polymerization is followed by means of specific gravity changes and the polymerization may be terminated by the addition of a "short stop," if desired, or the polymerization is carried to full conversion. Usually a buffer is added to aid in maintaining proper alkalinity during storage and processing. Reference is made to Table 1 on page 2 of the text by Carl for physical properties of a variety of neoprene latex films.

The aqueous phenolic resin dispersion usable in the practice of this invention is an alkaline catalyzed reaction product of formaldehyde and a difunctional phenol compound, such as the para-substituted phenols. Illustrative of para-substituted phenol are para-alkyl phenol where the alkyl group contains 1–12, inclusive, carbon atoms; p-tolylphenol, p-phenyl phenol; and para-cycloalkyl phenol (e.g., p-cyclohexylphenol). Particularly desirable para-substituted phenols are para-n.-propylphenol, para-n-butylphenol, para-n-amylphenol, para-n-octyl phenol, para-n-nonylphenol, para-i-propylphenol, para-i-butylphenol, para-i-amylphenol, para-t.-butylphenol, para-t.-amylphenol and p.-phenylphenol.

The condensation of a phenol and an aldehyde to form the resin is carried out in a reaction medium containing an alkaline catalyst. Illustrative of suitable catalysts are the following: alkali metal and alkaline earth metal hydroxides or oxides, as for example, sodium hydroxide, potassium hydroxide, calcium hydroxide, calcium oxide, barium hydroxide, barium oxide and the like, or an amine such as hexamethylenetetramine or ammonia.

The amount of catalyst used in producing the resole resins is about 0.01 to about 0.1 mole per mole of "phenol," preferably about 0.02 to about 0.05 mole per mole of "phenol." For a detailed discussion of condensates produced from a phenol and an aldehyde and methods for the production thereof, reference is made to the following:

"Phenolic Resins" by W. A. Keutgen ENCYCLOPEDIA OF POLYMER SCIENCE AND TECHNOLOGY Volume 10, pages 1–73 Published by Interscience, John Wiley — 1969

The phenolic resin used in aqueous dispersion form is the reaction product of formaldehyde and parasubstituted phenols, as defined above, which contains about 0 weight percent to about 12 weight percent of labile formaldehyde, based on the weight of the resin, as determined by the following procedure: Add 500 grams of phenolic resin, 250 ml of benzene, and 15 grams of p-toluene sulfonic acid monohydrate to a 1 liter, three neck, round bottom, Pyrex flask. Place a 5 ml Bidwell and Sterling distilling trap, or equivalent, in one hole and a 150°C. thermometer in the other hole. Close the third hole with a glass or cork stopper and use it for the addition of the resin. Connect a reflux condenser to the distilling trap. Heat the mixture to reflux by means of a heating mantle and Variac control. Reflux the solution vigorously (102° to 110°C.) until the water layer in the trap becomes constant in volume. Approximately 3 hours is usually required for this. Then cool to about 70°–80°C., discard the liquid in the trap, dry the trap and add exactly 65 grams of sample to the dried solution in the flask. Reflux the contents of the flask for two to three hours until a constant reading is obtained. Loosen any water droplets from the walls of the condenser and trap with the aid of a piece of copper wire. When the volume of water collected in the trap is constant, record the volume and calculate the methylol and methylene ether content (formaldehyde) as follows:

% Methylol and methylene ether = ML of water × 2.65

This value should be corrected for the moisture content of the resin as follows:

% Methylol = ML of water × 2.65 - % Resin Moisture × 31/18 [1.667]

The resin moisture is determined by the Karl Fischer method.

The aqueous dispersion of the phenolic resin is effected by emulsifying the resin containing a minimum concentration of water insoluble solvent. Therefore, the resin is an emulsified solvent resin solution. Typically, the solution contains not more than about 50 weight percent solvent, based on its weight, and preferably, at least about 10 weight percent solvent. In the usual case, solvent employed will range from about 15 weight percent to about 35–40 weight percent.

Suitable solvents include aromatic hydrocarbon solvents such as benzene, xylene, toluene and the like, aliphatic hydrocarbons such as mineral spirits, hexane, decane, and the like.

The resin may thereafter by added to water, alone or in combination with an emulsifier, in order to achieve a stable aqueous dispersion. A desirable emulsifier for achieving the dispersion is an alkali metal salt of a long chain aliphatic fatty acid, e.g., a fatty acid containing at least 12 carbon atoms to about 24 carbon atoms, as for example, lauric acid, myristic acid, palmitic acid, stearic acid, arachidic acid, behenic acid, lignoceric acid, and the like, the alkali metal salts of unsaturated fatty acids, such as, oleic acid, linolenic acid, linoleic acid, palmitoleic acid, erucic acid, ricinoleic acid, licanic acid, myristoleic acid, eleostearic acid, arachidonic acid, clupanodonic acid, and the like.

In the absence of these long chain fatty acid salts, the phenolic resin-solvent solution has relatively poor dispersion stability when agitated into an aqueous dispersion, in that the pot life of the dispersion is relatively short resulting in coagulation and separation from dispersion phase of the phenolic resin.

In the usual case, there is employed at least four parts by weight of the alkali metal salts of the long chain fatty acid for every 100 parts of the phenolic resin employed in the solution. Usually not more than about ten parts by weight of the alkali metal salt of the long chain fatty acid is employed for every 100 parts by weight of the phenolic resin.

The alkali metal moieties used in the formation of the alkali metal salts include sodium, potassium and lithium. The most preferred alkali metals are sodium and potassium.

Though the prime emulsifier is the alkali metal salt of the fatty acid, one may, in addition, optionally employ other emulsifiers in the manufacture of the aqueous phenolic resin dispersion. For example, one may substitute up to about 20 weight percent of the alkali metal salt of the fatty acid of the corresponding ammonium or amine salt of the fatty acid and achieve effective emulsification of the phenolic resin in the aqueous phase. In addition, one may in addition use the various emulsifying agents which are described in U.S. Pat. No. 3,666,694. For example, one may employ the proteinaceous compounds which are useable in an aqueous media at a pH of from 7 to 10, such as for example, casein in soya protein, ammoniated casein and gum arabic. In addition, one may also employ guar gum, Karaya gum, and ammonium alginate, and the like. The amount of these additional emulsifying agents provided in the formulation, when used, may range in and about two parts to about eight parts, preferably about three parts to about six parts, based on 100 parts by weight of the phenolic resin.

The aqueous phenolic resin dispersion is formed by simply mixing the solvent solution of the resin with water, an alkali metal hydroxide, the fatty acid, as indicated above, as well as any other emulsifying agent to be added, and rapidly stirring the mixture to cause the formation of a dispersed resin phase in a water continuous phase. In the preferred practice in manufacturing the emulsion, a solution of the resin and the solvent is formed and the fatty acid is dissolved in the solution. The resulting solution is thereafter added to an aqueous solution of the alkali metal, provided as the alkali metal hydroxide, and any other emulsifying agent employed. With rapid stirring the resin becomes the dispersed phase within the body of water and is excellently stable therein.

In the neoprene adhesive composition, one may mix as little as about 0.05 part by weight of the phenolic resin to as much as about 2 parts by weight of the phenolic resin for each part of neoprene, determined on 100% solids basis.

In the examples which follow, all parts are parts by weight, unless otherwise stated.

EXAMPLE 1

To a still was added 40 parts of 37% formalin, 100 parts of para-tertiary-butylphenol and 8 parts 25% aqueous NaOH. Atmospheric reflux of the contents was carried out for 1 ¼ hours at which time 50 parts toluene was added to the still and the batch was cooled to 70°C. by vacuum reflux. Then 2.5 parts of concentrated $H_2SO_4$ was added to 5 parts of water and the resulting solution added to the still. The batch was agitated 20 minutes at 70°C. and then allowed to settle into two layers. The bottom water layer was removed and 30 parts of water was added to the remaining solvent layer, agitated for 20 minutes and again allowed to settle into two layers. The bottom water layer was again removed and the resin solution was stripped of solvent atmospherically to 110°C., when, at the end of the solvent stripping step, vacuum (27–28 inches Hg) was applied and the temperature was raised to 115°C. The resin was held at 115°–120°C. to a tripod flow of 110–120 seconds before discharging. The labile formaldehyde content of this resin was 0.

EXAMPLE 2

A second resin was synthesized by the procedure of Example 1 using, instead, 113 parts of 40% formalin/100 parts of p-t-butyl phenol. This resin had a labile formaldehyde content of 6.9%.

EXAMPLE 3

The phenolic resin of Example 2 was dissolved in toluene to form a 65 weight % resin solution. To 154 grams of this 65 weight % solution was added 6 g. oleic acid to form the oil phase, or Part A, of the emulsion. Part B, the water phase, contained 4 g. of 25 weight % aqueous NaOH, 30 g. of 10 weight % ammoniated casein solution, 60 g. of 5 weight % gum arabic solution, and 77 g. of water. The formula is summarized below.

|  |  | Parts by Weight |
|---|---|---|
| Part A | Phenolic Resin of Ex. 2 | 100 |
|  | Toluene | 54 |
|  | Oleic acid | 6 |
| Part B | 25% Aqueous NaOH | 4 |
|  | 10% Ammoniated casein* | 30 |
|  | 5% Gum arabic** | 60 |
|  | Water | 77 |

*To prepare this solution, 100 parts of ammoniated casein were added to 497 parts by weight of water, 3 parts by weight Dowicide G (Dow Chemical Co.), and 2 parts by weight ammonia. After stirring for 30 minutes at room temperature the mixture was heated to 80°C. and stirring continued until the dispersion was complete (1 hr.). It was then diluted to 10% solids by adding 400 parts by weight water.
**The gum arabic solution was prepared by adding one part gum arabic (Stein, Hall & Co., Inc., grade A-10) to 19 parts water and stirring at room temperature until solution was complete.

To prepare the emulsion, Part A was added to Part B with high speed agitation using an Eppenbach mixer. Agitation was continued for at least 5 minutes.

EXAMPLE 4

The adhesive consists of neoprene latex, the phenolic resin emulsion, zinc oxide dispersion, and an antioxidant dispersion. The adhesive is prepared by simple mixing of these ingredients. The formula is shown in the following table.

| ADHESIVE FORMULATION | Parts by Weight | |
|---|---|---|
|  | Wet | Dry |
| Neoprene Latex 750* | 200 | 100 |
| Phenolic Resin of Ex. 3 | 167 | 50 |
| Zinc Oxide | 10 | 5 |
| Neozone D* | 4 | 2 |

*E. I. duPont de Nemours & Co. (Inc.)

The zinc oxide and Neozone D dispersions were prepared by ball milling the following blends of ingredients for 24 hours:

|  | Zinc Oxide Dispersion | Neozone D Dispersion |
|---|---|---|
| Zinc oxide (Kadox 15, N.J. Zinc) | 100 | — |
| Neozone D | — | 100 |
| Daxad 11* solution (10%) | 30 | 30 |
| Ammonium caseinate (10%) | 30 | 30 |
| Sodium silicate solution (10%) | 5 | — |
| Water | 35 | 40 |

*Dewey and Almy Chemical Division, W. R. Grace & Co.

EXAMPLE 5

One significant difference between water and solvent based neoprene contact adhesives is the level of pressure needed to obtain good contact between the mating adhesive-coated surfaces. In solvent systems, light pressure is usually sufficient to produce a satisfactory bond. With water-based adhesives, higher pressure must be applied. Convenient methods for doing this is to use either a set of nip rolls or a Jay roller. When either of these assembly methods is used, good contactability is obtained with the adhesive of Example 4. Peel strength (pounds per inch width) data of canvas to canvas bonds are shown in the following table:

PELL STRENGTH* OF ADHESIVE OF EXAMPLE 4
(*Rate of peel in 2 inches/minute; 180° peel)

| Open Time Hrs. | Assembly Method | Tested at 25°C. after | | | | At 70°C. after | |
|---|---|---|---|---|---|---|---|
| | | 1 hr | 1 day | 1 week | 3 weeks | 1 week | 3 weeks |
| ¾ | nip roller | 8C | 26C | 22A | 22A | 15C | 22C |
| | Jay roller | 10C | 22C | 22C | 23A | 15C | 22C |
| 2½ | nip roller | 10C | 23C | 21A | 22A | 14C | 19C |

A = Adhesive failure
C = Cohesive failure

Repeating Examples 3, 4 and 5 but replacing the phenolic resin of Example 2 with a commercial p-t-butyl phenol resin that had a labile formaldehyde content of 15.1%, resulted in an adhesive that had no contact properties after ½ hour open time (following application of the final adhesive coat). Peel strength was essentially zero.

EXAMPLE 6

The adhesive of Example 4 was compared with two commercial neoprene water-borne contact adhesives. Comparison of peel strengths, listed in the following table, show that the adhesive of Example 4 produces peel strengths in a commercially acceptable range with elevated temperature peel strength comparable to the best commercial adhesive but with superior green strength (initial peel strength following assembly). It was found that there was no significant change in peel strength within the first hour after assembly of the two adhesive coated substrates.

| | Peel Strength at 25°C. | | | | at 70°C |
|---|---|---|---|---|---|
| Open Time = ¾ hr. Tested After | 1 hr. | 1 day | 1 week | 3 wks. | 3 wks. |
| Adhesive of Example 4 | 13C | 19C | 32A | 44A | 25C |
| Commercial Adhesive A | 2C | 3C | 52A/C | 53A/C* | 25C |
| Commercial Adhesive B | 4C | 21A | 19A | 23A | 11A |

*dry on edges (only ~ 30% contact)
A = Adhesive failure
C = Cohesive failure

EXAMPLE 7

The phenolic resin of Example 1 was emulsified using the same procedure described in Example 3 and made into an adhesive as described in Example 4.

| Open Time Hrs. | Assembly Method | Peel Strength at 25°C. Tested After | | | | at 70°C. | |
|---|---|---|---|---|---|---|---|
| | | 1 hr. | 1 day | 1 wk. | 3 wk. | 1 wk. | 3 wks. |
| ¾ | nip roller | 8C | 17C | 23A | 24A | 18C | — |
| | Jay roller | 5C | 17C | 20A | 22A | 22C | 19A/C |
| 2½ hr. | nip roller | 6C | 18C | 20A | — | 18C | 18A/C |
| 17 hr. | nip roller | 14C | 20C | 18A | — | 15C | — |

The results show the utility of this resin in a water-borne neoprene adhesive. The retention of contactability after 17 hours is outstanding. In the above table, A means adhesive failure and C means cohesive failure.

What is claimed is:

1. An adhesive composition comprising a mixture of an aqueous dispersion of an alkaline catalyzed para-substituted phenol-formaldehyde resin having a labile formaldehyde content of about 0 weight percent to about 12 weight percent, based on the weight of the resin and a polychloroprene latex, in which there is present about 0.05 part by weight to about 2 parts by weight of the resin for each part of the polychloroprene.

2. The composition of claim 1 wherein the dispersion is a resin containing not more than 50 weight percent solvent, based on the resin's weight, emulsified with an alkali metal salt of a long chain aliphatic fatty acid in water.

3. The composition of claim 2 wherein the solvent is an aromatic or aliphatic hydrocarbon.

* * * * *